US009380252B2

(12) United States Patent
Slothouber et al.

(10) Patent No.: US 9,380,252 B2
(45) Date of Patent: Jun. 28, 2016

(54) SYSTEMS AND METHODS FOR USER EVENT DATA REDUCTION

(71) Applicant: FourthWall Media, Inc., Dulles, VA (US)

(72) Inventors: Louis P. Slothouber, Leesburg, VA (US); Jeffrey W. Johnston, Charlottesville, VA (US)

(73) Assignee: FOURTHWALL MEDIA, INC., Dulles, VA (US)

( * ) Notice: Subject to any disclaimer, the term of this patent is extended or adjusted under 35 U.S.C. 154(b) by 18 days.

(21) Appl. No.: 13/748,155

(22) Filed: Jan. 23, 2013

(65) Prior Publication Data

US 2013/0208190 A1    Aug. 15, 2013

Related U.S. Application Data

(60) Provisional application No. 61/589,662, filed on Jan. 23, 2012.

(51) Int. Cl.
*H04N 7/173*  (2011.01)
*H04N 5/50*  (2006.01)
*H04N 21/442*  (2011.01)
*H04N 21/658*  (2011.01)
*H04N 21/434*  (2011.01)
*H04N 21/8547*  (2011.01)

(52) U.S. Cl.
CPC .............. *H04N 5/50* (2013.01); *H04N 21/4345* (2013.01); *H04N 21/44222* (2013.01); *H04N 21/6582* (2013.01); *H04N 21/8547* (2013.01)

(58) Field of Classification Search
CPC . H04N 5/50; H04N 21/4345; H04N 21/8547; H04N 21/6582; H04N 21/44222
USPC ................................ 725/13, 14, 116; 348/731
See application file for complete search history.

(56) References Cited

U.S. PATENT DOCUMENTS

| 5,532,732 A | 7/1996 | Yuen |
| 5,872,588 A * | 2/1999 | Aras et al. ........................ 725/14 |
| 6,845,396 B1 | 1/2005 | Kanojia |
| 6,983,478 B1 | 1/2006 | Grauch |

(Continued)

OTHER PUBLICATIONS

International Search Report with Written Report from PCT/US2013/22725; Jan. 23, 2013.

*Primary Examiner* — Nnenna Ekpo
(74) *Attorney, Agent, or Firm* — Hunton & Williams LLP

(57) ABSTRACT

Disclosed herein are systems and methods for reducing the amount of data associated with user events. The systems and methods are particularly applicable to cable TV, satellite TV, and other networks where user event data (e.g., clickstream) must be sent from customer premises equipment (CPE) to centralized servers and the data transmission channel is narrow. In various exemplary embodiments, CPE such as television set-top boxes may reduce requirements for data storage and network bandwidth by replacing portions of channel-number/timestamp streams with abbreviated codes representing common meta-events such as "channel surfing events" and "previous channel events." The original channel-number/timestamp streams can be reconstituted on centralized servers. Other common sequences of events, including those involving activation of other buttons on remote controls (i.e., buttons not related to changing channels), keyboard keys, mouse pointing device controls, and the like may constitute meta-events and be similarly replaced by abbreviated codes.

30 Claims, 4 Drawing Sheets

(56) References Cited

U.S. PATENT DOCUMENTS

| | | |
|---|---|---|
| 7,370,073 B2 | 5/2008 | Yen |
| 7,689,672 B2 | 3/2010 | Kanojia |
| 8,060,398 B2 | 11/2011 | Canning |
| 2003/0110489 A1* | 6/2003 | Gudorf et al. .................. 725/35 |
| 2003/0212739 A1 | 11/2003 | Boucher |
| 2005/0235318 A1 | 10/2005 | Grauch |
| 2011/0197214 A1* | 8/2011 | Burton et al. .................. 725/13 |
| 2012/0278331 A1* | 11/2012 | Campbell et al. ............. 707/740 |
| 2013/0227611 A9* | 8/2013 | Grauch et al. ................. 725/46 |

* cited by examiner

SYSTEMS AND METHODS FOR USER EVENT DATA REDUCTION

CROSS-REFERENCE TO RELATED APPLICATIONS

This application claims priority to U.S. Provisional Patent Application 61/589,662 which is incorporated herein to the extent it does not conflict with the below disclosure.

FIELD OF THE INVENTION

Various exemplary embodiments of the invention relate to systems and methods for user event data reduction and specifically to user event data reduction on customer premises equipment such as set-top boxes in cable TV, satellite TV, and other band-limited networks.

BACKGROUND

With increasing connectivity between users and digital service providers afforded by the proliferation of computer networks and user devices, there is an increasing need to collect user event data to support system diagnostics, audience measurement, user experience personalization, and targeted advertising. User event data may include clickstream events such as channel change clicks and other button activations executed on controllers associated with devices such as televisions, set-top boxes, digital video recorders, personal video recorders, and game consoles. User events may also be logged from input devices such as keyboards, mice, touch pads, cameras, and microphones associated with, for example, computers, smart phones, personal digital assistants, tablet computers, and kiosks. Such data collection can be problematic in cable TV, satellite TV, and other networks where bandwidth and memory are scarce, a large number of customers exist, event resolution is high, and/or the volume of event data is significant.

Some existing arts log, store, and transmit all raw clickstream events. This can pose a significant load on limited memory and bandwidth resources, especially if event frequency and resolution are high.

Other arts encode user events in XML or other non-compact data representations, which may increase memory and bandwidth requirements even further.

Other arts ignore or drop certain data sequences to save memory and bandwidth resulting in incomplete or ambiguous data being delivered to receiving devices.

Other arts reduce user event data using standard compression algorithms, which may be costly for user devices in terms of processing time and memory needed to support algorithm operation.

Other arts may attempt to reduce data in other ways, such as by compressing channel-number/time-code data associated with a program and transmitting it in the vertical blanking interval of the program broadcast. Such methods do not take advantage of sequences of user events for additional data reduction and do not provide sufficient time resolution for channel-tuning events.

The current arts have yet to provide ways to reduce the volume of user event data in a way that is computationally tractable, effective, unambiguous, and adequately reversible.

SUMMARY OF THE INVENTION

In various exemplary embodiments, a method is provided for reducing the amount of user event data by sequentially accessing raw user event codes generated by a user device, transforming those codes into meta-event codes wherever possible (where meta-event codes are abbreviated codes representing common sequences of raw user events in a form suitable for reconstituting on a receiving device), and outputting transformed and untransformed codes to the receiving device.

In various exemplary embodiments, raw user event codes may be, for example, time-stamped television channel change event codes; mute/un-mute event codes; volume change level codes; start, stop, pause, rewind, fast-forward audio/video recorder event codes; power on/off event codes; trick play event codes; keyboard key press event codes; mouse pointing device event codes, microphone input event codes, video input event codes; GPS location codes; keypad press codes; accelerometer event codes; and gesture detection device event codes.

In various exemplary embodiments, a user device may be, for example, a set-top box, integrated television controller, audio/video tuner/receiver, digital video recorder, personal video recorder, game console, personal computer, tablet computer, smart phone, personal digital assistant, or kiosk.

In various exemplary embodiments, transforming raw user event codes into meta-event codes may comprise, for example, transforming television channel-change/timestamp event codes into a "channel surf" meta-event code by buffering multiple television channel-change/timestamp event codes while the codes represent a sequence of monotonically increasing or decreasing valid channel numbers each tuned for a short configurable amount of time, and replacing those codes with an abbreviated code representing the "channel surf" meta-event and associated timestamp.

In various exemplary embodiments, transforming raw user event codes into meta-event codes may comprise, for example, transforming a raw television channel-change/timestamp event code into a "previous channel" meta-event code by buffering multiple television channel-change/timestamp event codes while the codes represent a sequence of alternating channel numbers, and replacing the channel number part of the code with an abbreviated code representing the "previous channel" meta-event for those codes that indicate a return to an immediately previously-tuned channel.

In various exemplary embodiments, the receiving device may be, for example, a centralized server; cable, satellite, or IP TV company headend server; or distributed server.

In various exemplary embodiments, output of reduced codes may be, for example, over a cable, satellite, or IP TV network; the Internet; local area network; or cellular network.

In various exemplary embodiments, meta-events may be determined using statistical analysis of streams of raw user event data over populations of users to identify common event streams suitable for replacement by abbreviated meta-event codes.

In various exemplary embodiments, a method is provided for reconstituting user event data by sequentially accessing user event codes including meta-event codes (where the meta-event codes are abbreviated codes representing common sequences of raw user events), detecting and transforming the meta-event codes into raw user event codes, and outputting the transformed codes and the original codes in the proper sequence.

It is to be understood that both the foregoing general description and the following detailed description are exemplary and explanatory only, and are not restrictive of the inventions as claimed. The accompanying drawings constitute a part of the specification, illustrate certain embodiments of the invention and, together with the detailed description, serve to explain the principles of the invention.

BRIEF DESCRIPTION OF DRAWINGS

The invention can be more fully understood by reading the following detailed description together with the accompanying drawings, in which like reference indicators are used to designate like elements, and in which.

DETAILED DESCRIPTION OF THE INVENTION

Figure 1:
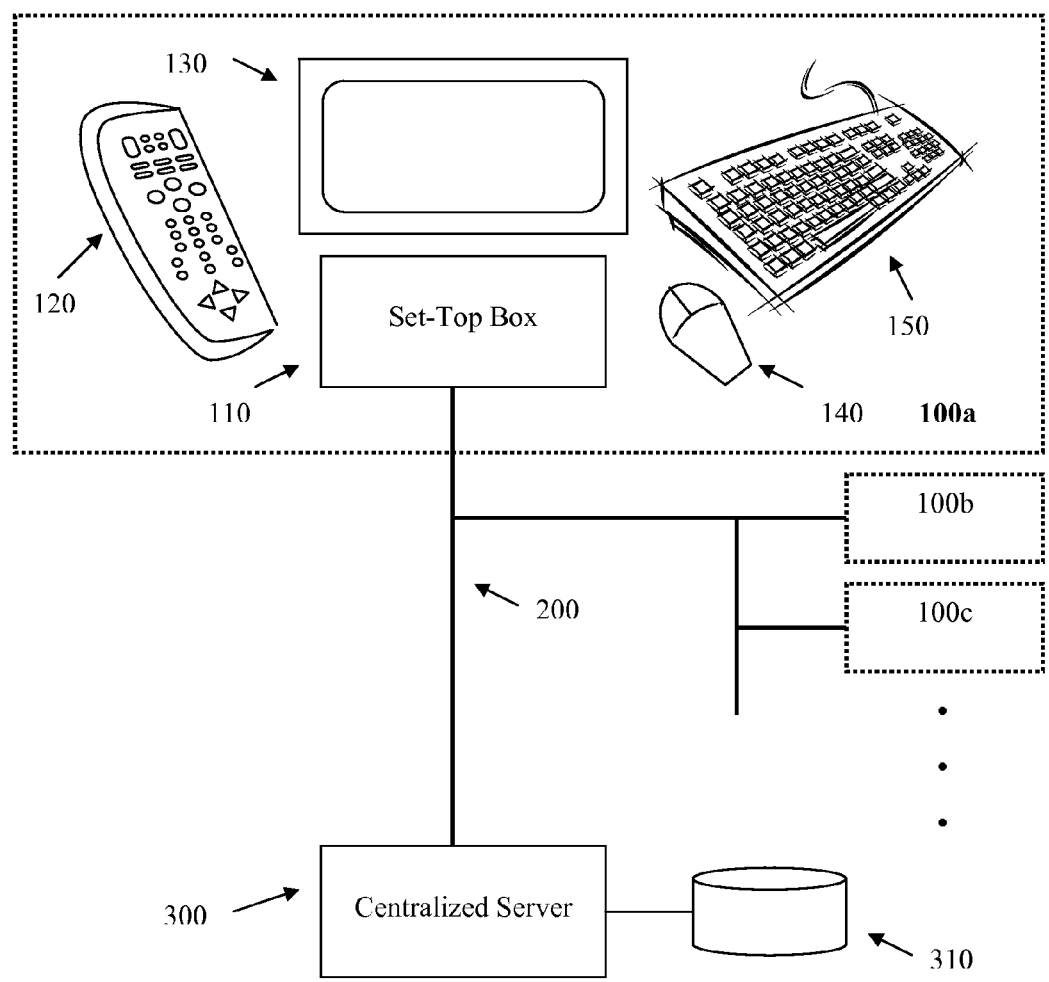
FIG. 1 is a diagram depicting an exemplary embodiment of a system for collecting and reducing user events.

FIG. 1 is a diagram depicting an exemplary embodiment of a system for collecting and reducing user events. Blocks 100a, 100b, and 100c represent user locations where customer premises equipment (CPE) may exist such as a set-top box 110, remote control device 120, display screen 130, mouse pointing/selection device 140, and computer keyboard 150. Customer premises equipment 100a-c may connect via a set-top box 110 through a network 200 to a centralized server 300 which has read/write access to data storage 310. In one exemplary embodiment, remote control device 120 is a television remote, display screen 130 is a television screen, network 200 is a cable, satellite, or IP TV network, and centralized server 300 is a data logging server located at a TV service provider's head end or other centralized or distributed location. The indicated set-top box 110 may alternatively be one or more of a tuner/receiver device, digital video recorder, personal video recorder, game system, or similar device internally integrated into a television or externally connected to a display device, capable of receiving video, audio, and/or interactive applications, and/or other signals, and also capable of processing data, logging user events, and transmitting event data to a centralized server 300 over network 200. The set-top box 110 may further comprise one or more computer processors capable of executing the methods and systems set forth below and above, one or more digital signal processors, one or more video accelerators.

In addition to remote control 120, mouse pointing device 140, and keyboard 150 depicted in FIG. 1, other input devices such as touch sensitive keypads, microphones, video cameras, GPS transmitters, accelerometers, gesture detection devices, and the like may be provided and supported for user event logging. Similarly, devices such as personal computers, tablet computers, smart phones, and personal digital assistants may be suitable for the data reduction methods disclosed herein. The set-top box 110 may comprise one or more methods for communicating with the input devices set forth above and below. For example and not by way of limitation, the set-top box 110 may provide one or more Bluetooth modules, one or more WiFi connections, one or more USB ports, one or more RF (radio frequency) sensors, one or more IR (infrared) sensors, one or more NFC modules, one or more RFID modules, LTE modules, one or more WiGig interfaces, one or more WHDI (wireless high definition interface) connections, any other means of communication.

In various exemplary embodiments, the network 200 may be a wireless network, a wired network, or any combination of wireless network and wired network. For example, the network may include any, or a combination, of a fiber optics network, a passive optical network, a radio near field communication network (e.g., a Bluetooth network), a cable network, an Internet network, a satellite network (e.g., operating in Band C, Band Ku, or Band Ka), a wireless local area network (LAN), a Global System for Mobile Communication (GSM), a Personal Communication Service (PCS), a Personal Area Network (PAN), D-AMPS, Wi-Fi, Fixed Wireless Data, IEEE 802.11a, 802.11b, 802.15.1, 802.11n and 802.11g, or any other wired or wireless network configured to transmit or receive a data signal. In addition, network 200 may include or connect to, without limitation, a telephone line, fiber optics, IEEE Ethernet 802.3, a wide area network (WAN), a LAN, or a global network, such as the Internet. Also, the network may support an Internet network, a wireless communication network, a cellular network, a broadcast network, or the like, or any combination thereof. The network may further include one or more of the exemplary types of networks mentioned above operating as a stand-alone network or in cooperation with each other. The network may utilize one or more protocols of one or more network elements to which it is communicatively coupled. The network may translate to or from other protocols to one or more protocols of network devices. The network may include a plurality of interconnected networks, such as, for example, a service provider network, the Internet, a broadcaster's network, a cable television network, corporate networks, and home networks.

In various exemplary embodiments, data storage 310 may be network accessible storage and may be local, remote, or a combination thereof to network 200. Data storage 310 may utilize non-volatile semi-conductor memory, a redundant array of inexpensive disks ("RAID"), tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), or other computer accessible storage. Data storage 310 may include, for example, a database, such as an Oracle database, a Microsoft SQL Server database, a DB2 database, a MySQL database, a Sybase database, an object oriented database, a hierarchical database, flat file structures, or other database, for managing the storage and retrieval of data.

The various components of the system as shown in FIG. 1 may be further duplicated, combined, separated and/or integrated to support various applications and platforms. Additional elements may also be implemented in the systems described above to support various applications.

Figure 2:
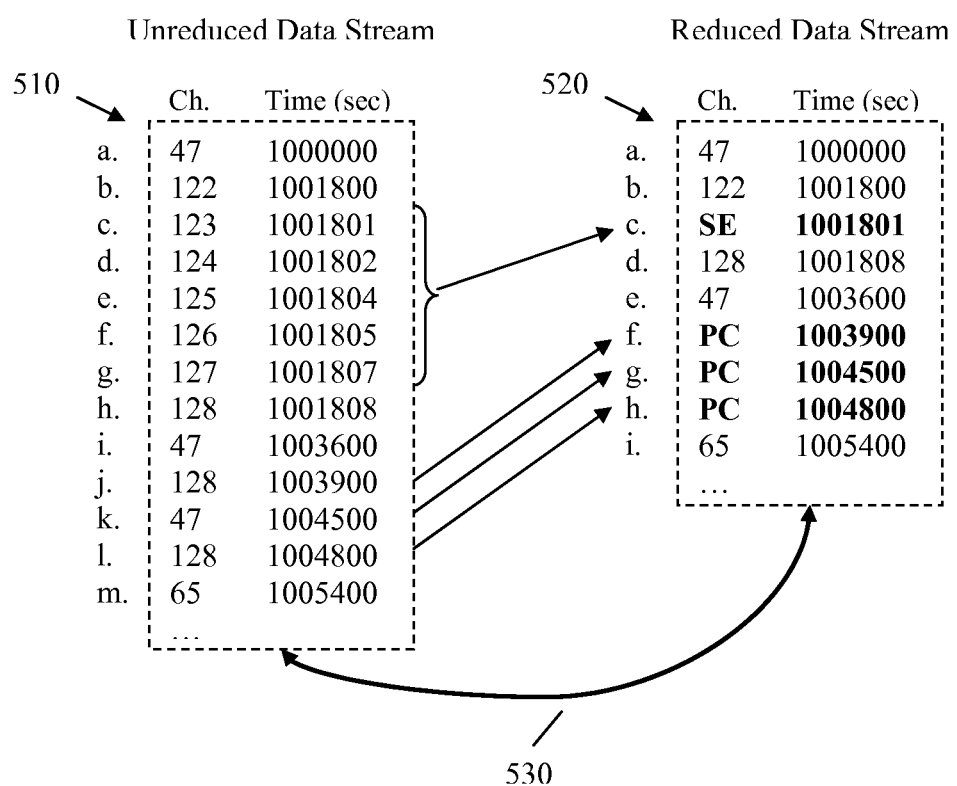
FIG. 2 is an exemplary diagram depicting a stream of channel event data before and after data reduction.

FIG. 2 is an exemplary diagram depicting a stream of channel tuning events before and after data reduction. The numbers, codes, letters, and other representations used in FIG. 2 are for example and are not limiting. Block 510 represents an unreduced data stream, block 520 represents a reduced data stream, and arrow 530 represents a transcoding process whereby the two streams may be transformed from one into the other. In one exemplary embodiment, the unreduced data stream 510 may be transformed into the reduced data stream 520 by software or hardware running on a set-top box 110 before the data is sent to a centralized server 300. Once received by the centralized server 300, the reduced stream 520 may be restored to its original unreduced form 510, or an approximation thereof, before being written to mass storage 310. Such restoration may be approximate due to certain transcoding processes being "lossy," as discussed below. In some embodiments, rather than reconstructing all unreduced data 510 on servers 300, some compressed meta-event codes (e.g., "channel surf events") may be discarded and not stored in associated mass storage 310 if such events are not of interest to particular operators.

Per the simplified data streams depicted in FIG. 2, each exemplary channel tuning event may be represented by codes for channel number and the time a viewer tuned to each channel. Codes may correspond to any coding method. For purposes of illustration, codes depicted in the first columns of blocks 510 and 520 may represent the numbers of the channels being tuned or a special meta-event code. The corresponding times in the second columns of blocks 510 and 520 represent the time in seconds when the channel was tuned to or, in general, when the indicated event began.

For example, the first code in the unreduced data stream 510 of FIG. 2 corresponding to "event a" (510*a*) may indicate channel number 47 was tuned in at time 1000000 seconds. The tuning time may be relative to a predefined base time in the past which can be used to compute an actual date-time stamp for the event (e.g., time 0 may represent midnight of a particular past date). Base times may be recent relative to the events being encoded (e.g., midnight of the current day), thus reducing the lengths of the timestamps associated with each event (e.g., much shorter than the 7-digit timestamps depicted in the simplified example). Such base times may be transmitted in a data stream header to fully characterize actual event times.

The next event, "event b" (510*b*), may indicate that channel 122 was tuned in at time 1001800. This may indicate channel 47 was tuned for exactly 30 minutes (i.e., 10001800−1000000=1800 seconds=30 minutes) before the channel was changed to 122.

Subsequent channel change events 510*c*, 510*d*, 510*e*, 510*f*, 510*g*, and 510*h* may indicate the viewer was rapidly changing channels using the channel-up button on a remote control 120, stopping on each for up to a few seconds. As indicated by the event data for events 510*b-h*, channel 122 was tuned for 1 second, channel 123 for 1 second, channel 124 for 2 seconds, channel 125 for 1 second, channel 126 for 2 seconds, and channel 127 for 1 second. As described herein, this may indicate a "channel surf event" has occurred. Such events in the unreduced data stream 510 may be represented in the reduced data stream 520 by a single "surf event" (SE) code, replacing codes 510*c-g* with the code "SE 1001801" (event 520*c*). The "SE" code may indicate a "channel surf event" has occurred. SE may preferably be encoded using a code shorter than those used to encode channel numbers and other events. The time part "1001801" in event 520*c* may indicate the "channel surf event" started at time 1001801 seconds, corresponding to the time associated with the original incipient event 510*c*. In FIG. 2, once the viewer tuned to channel 128 at time 1001808 per event 510*h*, the "channel surf event" may be judged to be over and standard channel-number/timestamp code pairs again used to represent channel change events in the reduced data stream 520 (i.e., event 520*d*).

Semantics of the "channel surf event" code (SE) may be: "the viewer rapidly changed channels up or down, visiting all valid channels sequentially from the channel indicated by the event immediately preceding the 'channel surfing event' through the channel indicated in the event immediately succeeding the 'channel surfing event'." Given this semantic, a receiving system 300 can approximately reconstruct the original channel-change event code sequence by allocating time to all intervening channels visited during the entire "channel surf event." In the current example, since the time for the channel change event succeeding the "channel change event" (in event 520*d*) is 1001808 seconds and the time of the incipient event 520*c* is 1001801, the system may allocate 7 seconds (e.g., 1001808−1001801) as the total time spent "surfing" from channel 123 through 127. Those 7 seconds will be allocated to channels 123 through 127 in reconstructing events 510*c-g*. Such allocation may preferably be proportional with equal time differences allocated to all events if timing resolution allows, or randomly distributed in nearly equal chunks to each channel, or some other reasonable allocation method appropriate to the application. Assuming an equitable random allocation with events of 1 second resolution, 7 seconds must be allocated in 1 second increments to 5 channels (i.e., 123-127). This means 3 channels will have 1 second event times assigned and 2 channels will each get 2 seconds. Such a reallocation may result in an unreduced data stream being reconstituted as:

| c. 123 | 1001802 |
| d. 124 | 1001803 |
| e. 125 | 1001804 |
| f. 126 | 1001806 |
| g. 127 | 1001807 |

This sequence differs slightly from the original event timings in 510. The original stream had 2 second landing times for channels 124 and 126, and 1 second for the other channels. The reconstituted stream has 2 seconds allocated to channels 123 and 125, and 1 second to the others. Thus, the data reduction and reconstitution process may be lossy for such events, but acceptable for real world applications. Subsequent events will have accurate timestamps associated with them, thus being effectively "re-synchronized."

Other channel-change event semantics may be defined as appropriate to particular systems. For example, event times (i.e., the second column of blocks 510 and 520) may represent total durations of events represented by the codes in the first column (e.g., total time from tune-in to tune-away for channel-change events).

Continuing with the example depicted in FIG. 2, after landing on channel 128 as represented by event 510*h*, the viewer may have remained tuned to channel 128 for 1792 seconds (i.e., 1003600−1001808=1792) before tuning to channel 47 in event 510*i*. (This is 8 seconds short of 30 minutes and may indicate the viewer watched an entire 30-minute program on channel 128.) Five minutes (300 seconds) later, at time 1003900, the viewer tuned to channel 128 per event 510*j*. 10 minutes (600 seconds) after that, at time 1004500, the viewer tuned back to channel 47. As described herein, this sequence may be recognized as a "previous channel event." Therefore, in the reduced data stream 520, rather than retaining full channel numbers, the newly tuned channel code may be replaced by an abbreviated "previous channel" (PC) code. Such a code may be encoded with fewer bits than a channel number. In this embodiment, for example, the event time code may be retained and encoded as it was for the standard channel event code. As depicted in FIG. 2, there are three consecutive "previous channel events" in which all three associated channel numbers are replaced using the PC code (i.e., events 510*j*, 510*k*, 510*l* transcoded to events 520*f*, 520*g*, 520*h*). The depicted channel change events may represent a viewer tuning back and forth between two favorite channels (i.e., channels 128 and 47) or events of interest on those channels, alternating between spending 5 minutes on one and 10 minutes on the other. Such a sequence may be enabled by use of "previous channel" or "favorite/pre-set channel" buttons on TV remote controls. Similar to the "channel surfing event" case, the original channel number codes can be reconstructed on centralized servers 300, for example, based on the semantics of the PC code and surrounding data.

Finally, to complete the FIG. 2 example, the last event depicted in the unreduced data stream 510*m* may represent a tuning change from channel 128 to channel 65 at time 1005400 (i.e., after 10 minutes (600 seconds) on channel 128). In the example, code 510*m* is transferred as is to the reduced data stream 520*i* since it is not part of a subsequent "channel changing event," "previous channel event," or other compressible meta-event.

As described herein, timestamps may be relative to a base time occurring in the recent past, such as 00:00:00 on the current date. In such an embodiment, and relative to the example given in FIG. 2, a first channel change event may occur 10,000 seconds after 00:00:00. Subsequent events may be encoded as durations relative to the occurrence of the last event. Using this approach, the first five reduced events in block 520 may be:

a. 47 10000
b. 122 1800
c. SE 1
d. 128 7
e. 47 1792

This may allow timestamp integers to be much smaller. In fact, in such an embodiment, a buffer of events would never span a day boundary. Thus the maximum timestamp value for events would be 24*60*60=86400.

Use of such shorter codes (e.g., "SE," "PC") and elimination of codes for multiple events (e.g., SE events 510*c-g*) may effectively reduce the amount of data that needs to be sent from CPE 110 to centralized servers 300 over network 200 and, potentially, the amount of data written to mass storage 310.

Other common sequences of events, including those involving activation of, for example, volume-up/volume-down, mute/un-mute, start/stop/pause/rewind/fast-forward, power on/off, trick play, and other buttons on remote controls associated with TVs, STBs, digital video recorders, video cassette recorders, personal video recorders, and similar devices such as keyboard keys, computer mice, mobile phones, tablet computers, and other devices may constitute meta-events and be similarly replaced by abbreviated codes.

Timestamp resolutions may be greater than or less than one second as required and supported by target systems (e.g., tenth or hundredth of a second). Timestamps may also represent absolute dates and times of the occurrence of associated events rather than durations of events relative to a predefined base time. For example, a date-time stamp of "07/04/11 14:25:09" may indicate an associated event occurred at 25 minutes and 9 seconds after 2 PM on Jul. 4, 2011. Timestamps and event codes may be represented using any other method of representation as well.

In another exemplary embodiment, user clickstreams may be algorithmically analyzed using techniques known in artificial intelligence, machine learning, data mining, and statistical analysis to identify common sequences of events which can have compact codes defined and substituted when detected in input streams. Such analyses may be applied to individual households, neighborhoods, the entire population of users, or other segments of users which can than be reliably associated with an appropriate "code book" to effectively provide the subject data reduction and reconstitution (i.e., transcoding).

Figure 3:
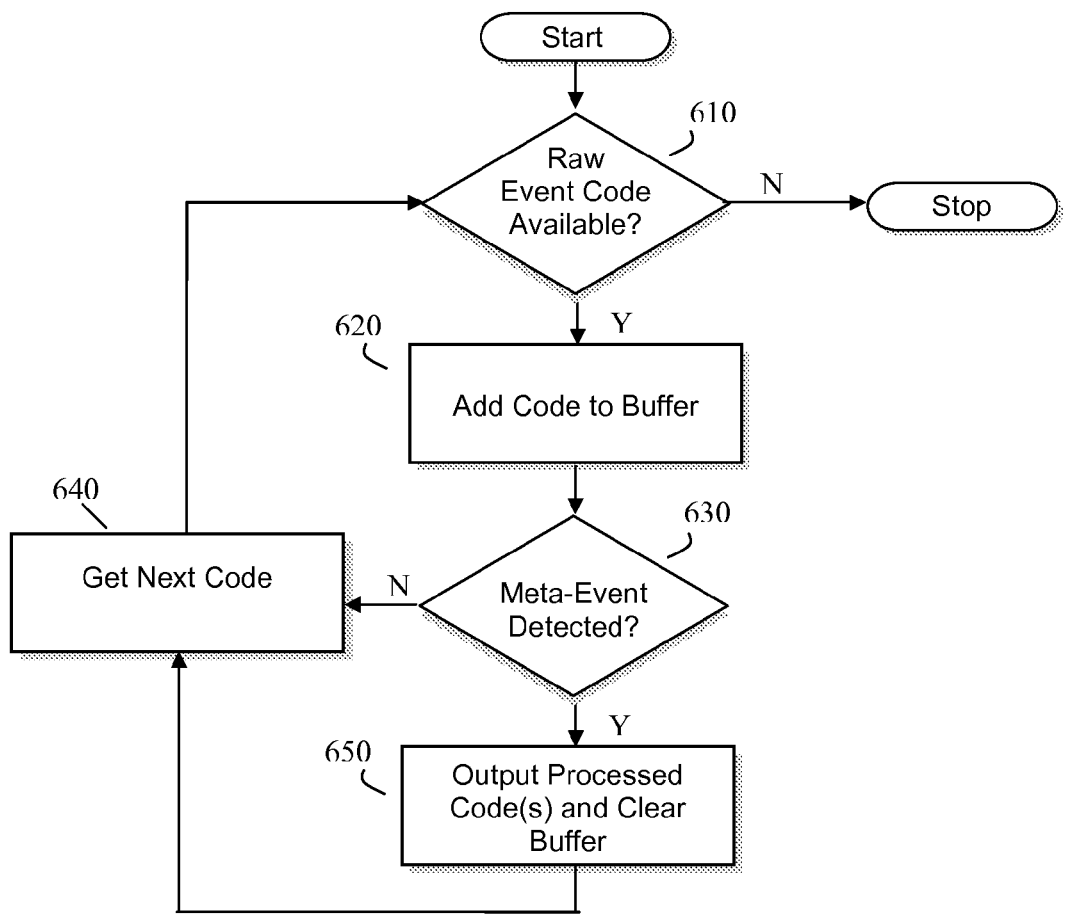
FIG. 3 is an exemplary flowchart depicting a method for reducing user event data.

FIG. 3 is an exemplary flowchart depicting a method for reducing user event data. After starting the process, in step 610 the unreduced data stream is checked for availability of a raw event code. Such raw event codes may be channel-number/timestamp codes as depicted in FIG. 2, block 510, and described herein with respect to FIG. 2. Such events need not represent just channel-change events, but may represent any user actions executed on any CPE, for example. If no raw event codes are available, the process may stop. But if a code is available, it may be added to a buffer in step 620. Next, in step 630, the code buffer may be analyzed to determine whether a meta-event exists. A meta-event may be, for example, a raw event or series of events that is amenable to reduction by one or more data reduction algorithms.

As discussed in relation to FIG. 2, two such meta-events may be "channel surf event" (SE) and "previous channel event" (PC). In the SE case, the data reduction algorithm may be configured to detect the occurrence of a sequence of consecutively numbered valid channels (monotonically increasing or decreasing) each tuned for a short (configurable) amount of time. In various exemplary embodiments, channel change events need not be consecutively numbered to be encoded as a "channel surf event." Rather, they may be sequential in a known list of favorite channels, which are each briefly tuned in list order. In the PC case, the algorithm may detect when a user toggles between two channels visited just previously. If either such sequence, or other reducible sequences not specifically described herein, are detected, processing may proceed with step 650 in which processed code(s) are output and the buffer cleared. In the SE case, an SE meta-event code and accompanying timestamp may be output in lieu of the multiple channel numbers and durations. In the PC case, a (shorter) PC meta-event code may be output in lieu of the actual previous channel number. Meta-event detection algorithms may add event codes to the buffer until a "maximally reducible" event is detected to assure maximum compression. For example, an entire sequence of "channel surf events" may preferably accumulate before an SE code is emitted, thus avoiding emitting such a code before an entire surfing meta-event is complete.

Returning to step 630, if the buffer contains events that are not reducible, that situation may be recognized, the non-reduced codes may be output, and the buffer cleared per step 650. (Such events may be considered "degenerate meta-events" for purposes of this method.) Alternatively, if the buffer does not currently contain data indicating a meta-event, but may contain such data in the future, processing may proceed to step 640 where a next code is read from the input stream and processing continues with step 610. After processed code(s) are output and the buffer cleared in step 650, processing may continue with step 640 where a next code is read if available.

The process depicted in FIG. 3 may be implemented in software or hardware running on a set-top box 110 or similar device, as described herein. The process may rely on raw clickstream or other user event data captured by other software or hardware running on the same device or other device(s) provided as a CPE. Reducible meta-events may be defined that take advantage of any common sequence of user events, beyond channel-change events and SE/PC codes, as may be determined by statistical analysis of user event streams from any kind of user input device and supported by suitable raw-event-to-meta-event semantics. Both the data capture and data reduction processes may be implemented, for example, as mini-application(s) (a.k.a. widget or TV widget software) using the enhanced television binary interchange format (EBIF), OpenCable Application Platform (OCAP), or similar frameworks.

Figure 4:
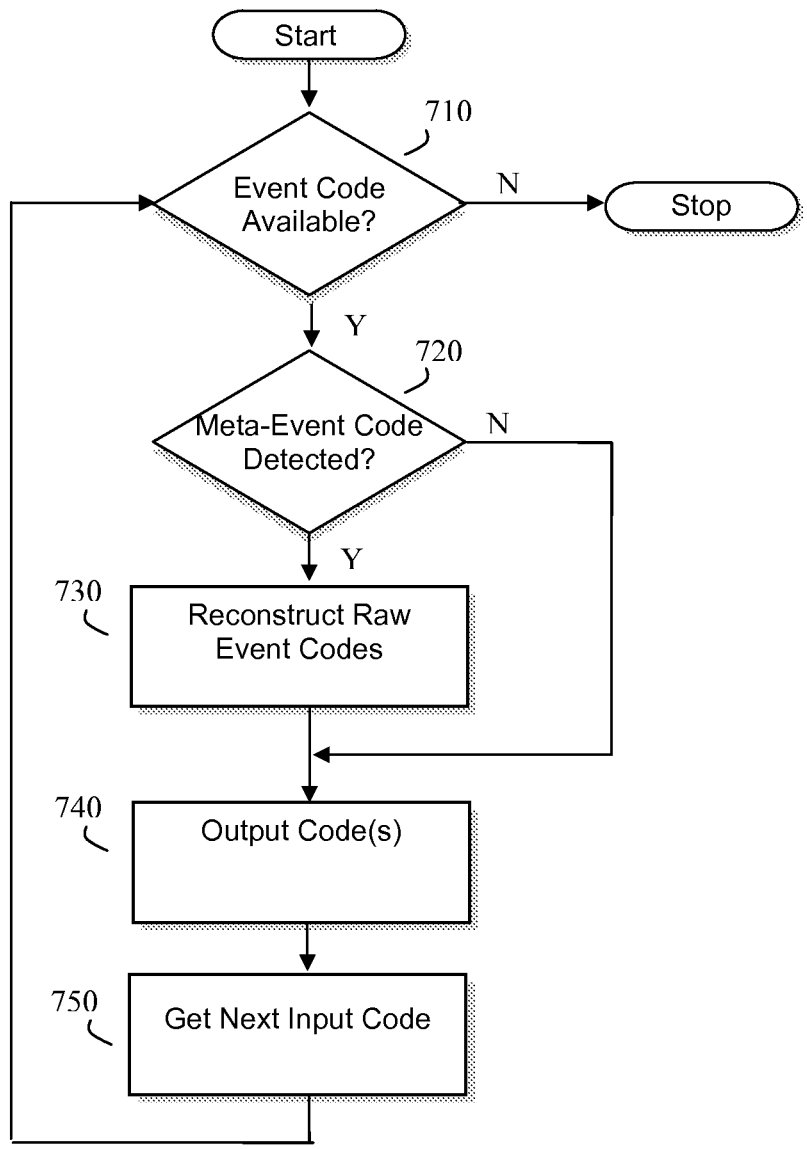
FIG. 4 is an exemplary flowchart depicting a method for reconstituting user event data.

FIG. 4 is an exemplary flowchart depicting a method for reconstituting user event data from previously reduced data. Once the process starts, in step 710 the data from a reduced data stream, including meta-events, may be checked for availability of an event code. If no event codes are found, the process may stop. If an event code is found, the code may be checked in step 720 for whether or not it is a meta-event code. If it is a meta-event code, processing may continue to step 730 where raw event codes are reconstructed based on the meta-event code and, potentially, surrounding events in the stream. (This may require some buffering of the reduced event code stream, depending on event semantics.) If the SE "channel surf event" meta-event code is detected, the SE code is transformed into an appropriate sequence of channel tuning events consistent with "channel surfing," for example, as described herein with respect to FIG. 2. If the PC "previous channel event" meta-event code is detected, the PC code is transformed into the appropriate actual channel number and timestamp, for example, as described herein. Other meta-event codes, not described herein, may be similarly transformed into raw clickstream or other event data as appropriate to the respective meta-event code semantics.

After raw event codes are reconstructed per step 730, or if a meta-event code was not detected in step 720, processing may continue with step 740 where the appropriate raw event code(s) are output to data storage 310. (If step 720 returns No (N), these codes may essentially be passed through from the current (reduced) code stream. If step 720 returns Yes (Y) and step 730 is executed, these codes may be reconstructed raw codes based on the meta-event code semantics.)

Finally, step 750 may be executed where the next input code is retrieved for processing and the process continues with step 710.

The process depicted in FIG. 4 may be implemented in software or hardware running on a centralized server 300 or similar device (as previously discussed) after having been reduced and transmitted by a set-top box 110 or similar device over a network 200.

The user event data reduction systems and methods described herein are not mutually exclusive to other data compression/decompression methods. In various exemplary embodiments, additional standard or proprietary compression methods known to those skilled in the art may be applied to the already-reduced data as generated by the systems and methods described herein to achieve additional compression. Also, in various exemplary embodiments, unlike some compression schemes such as dictionary coding, the exemplary systems and methods need not require exact sequences of events to be previously encountered, or a dictionary with all possible event sequences to be constructed, for the systems and methods to be effective.

Embodiments, or portions of embodiments, disclosed herein may utilize any of a wide variety of technologies including a special purpose computer, a computer system including a microcomputer, mini-computer, or mainframe, for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing any of the steps of the processes described herein.

It is to be appreciated that a set of instructions (e.g., computer software) that configures a computer operating system to perform any of the operations described herein may be contained on any of a wide variety of media or medium, as desired. Further, any data that is processed by the set of instructions might also be contained on any of a wide variety of media or medium. That is, the particular medium (e.g., memory) utilized to hold the set of instructions or the data used in the embodiments described herein may take on any of a variety of physical forms or transmissions, for example. Illustratively, the medium may be in the form of a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by a computer.

It is also to be appreciated that the various components described herein, such as a computer running executable computer software, may be located remotely and may communicate with each other via electronic transmission over one or more computer networks. As referred to herein, a network may include, but is not limited to, a wide area network (WAN), a local area network (LAN), a global network such as the Internet, a telephone network such as a public switch telephone network, a wireless communication network, a cellular network, an intranet, or the like, or any combination thereof. In various exemplary embodiments, a network may include one, or any number of the exemplary types of networks mentioned above, operating as a stand alone network or in cooperation with each other. Use of the term network herein is not intended to limit the network to a single network.

It will be readily understood by those persons skilled in the art that the present invention is susceptible to broad utility and application. Many embodiments and adaptations of the present invention other than those herein described, as well as many variations, modifications, and equivalent arrangements, will be apparent from or reasonably suggested by the present invention and foregoing description thereof, without departing from the substance or scope of the invention.

While the foregoing illustrates and describes exemplary embodiments of this invention, it is to be understood that the invention is not limited to the construction disclosed herein. The invention can be embodied in other specific forms without departing from its spirit or essential attributes.

What is claimed is:

1. A method for reducing the amount of user event data, comprising:
    sequentially logging raw user event codes generated by a user device, wherein the raw user event codes comprise codes indicating button activations and other raw inputs from input devices associated with the user device;
    transforming a portion of the sequentially-logged raw user event codes into meta-event codes when reducible sequences are detected, wherein meta-event codes are abbreviated codes representing common sequences of raw user events in a form suitable for reconstituting on a receiving device;
    outputting transformed and untransformed codes to the receiving device; and
    wherein the meta-event codes are reconstituted at the receiving device into the portion of the sequentially-logged raw user event codes by interpreting semantics of the meta-event codes in a context of the untransformed codes that were output to the receiving device.

2. The method of claim 1, wherein the raw user event codes are time-stamped and comprise one of the following:
    television channel change event codes, mute/un-mute event codes, volume change level codes, start, stop, pause, rewind, fast-forward audio/video recorder event codes, power on/off event codes, trick play event codes, keyboard key press event codes, mouse pointing device event codes, microphone input event codes, video input event codes, GPS location codes, keypad press codes, accelerometer event codes, and gesture detection device event codes.

3. The method of claim 1, wherein the user device is one of a: set-top box, integrated television controller, audio/video tuner or receiver, digital video recorder, personal video recorder, game console, personal computer, tablet computer, smart phone, personal digital assistant, or kiosk.

4. The method of claim 1, wherein transforming a portion of the sequentially-logged raw user event codes into meta-event codes comprises transforming television channel-change/timestamp event codes into a "channel surf" meta-event code by:
buffering multiple television channel-change/timestamp event codes while the codes represent a sequence of monotonically increasing or decreasing valid channel numbers each tuned for a short configurable amount of time; and
replacing those codes with an abbreviated code representing the "channel surf" meta-event with an associated timestamp.

5. The method of claim 1, wherein transforming a portion of the sequentially-logged raw user event codes into meta-event codes comprises transforming a raw television channel-change/timestamp event code into a "previous channel" meta-event code by:
buffering multiple television channel-change/timestamp event codes while the codes represent a sequence of alternating channel numbers; and
replacing the channel number part of the code with an abbreviated code representing the "previous channel" meta-event for those codes that indicate a return to an immediately previously-tuned channel.

6. The method of claim 1, wherein the receiving device is one of a: centralized server, cable, satellite, or IP TV company headend server, or distributed server.

7. The method of claim 1, wherein the outputting further comprises transmitting transformed and untransformed codes over one of a: cable, satellite, or IP TV network, the Internet, local area network, or cellular network.

8. The method of claim 1, wherein meta-events are determined using statistical analysis of streams of raw user event data over populations of users to identify common event streams suitable for replacement by abbreviated meta-event codes.

9. A method for reconstituting user event data, the method comprising:
sequentially logging raw user event codes generated by a user device;
transforming a portion of the sequentially-logged raw user event codes into meta-event codes when reducible sequences are detected;
sequentially accessing the raw user event codes and the meta-event codes, wherein the meta-event codes are abbreviated codes representing common sequences of raw user events, wherein the raw user event codes comprise codes indicating button activations and other raw inputs from input devices associated with the user device;
detecting and reconstituting the meta-event codes into the portion of the sequentially-logged raw user event codes;
outputting the reconstituted codes and untransformed raw user event codes in the proper sequence; and
wherein the meta-event codes are reconstituted at the user device into the portion of the sequentially-logged raw user event codes by interpreting semantics of the meta-event codes in a context of the untransformed codes that were output to the user device.

10. The method of claim 9, wherein the raw user event codes are time-stamped and comprise one of the following:
television channel change event codes, mute/un-mute event codes, volume change level codes, start, stop, pause, rewind, fast-forward audio/video recorder event codes, power on/off event codes, trick play event codes, keyboard key press event codes, mouse pointing device event codes, microphone input event codes, video input event codes, GPS location codes, keypad press codes, accelerometer event codes, and gesture detection device event codes.

11. The method of claim 9, wherein the user device is one of a: set-top box, integrated television controller, audio/video tuner or receiver, digital video recorder, personal video recorder, game console, personal computer, tablet computer, smart phone, personal digital assistant, or kiosk.

12. The method of claim 9, wherein detecting and reconstituting the meta-event codes into the portion of sequentially-logged raw user event codes comprises:
identifying the type of meta-event code;
transforming the meta-event code into an appropriate sequence of channel tuning events if the meta-event code represents a "channel surf" event;
transforming the meta-event code into the appropriate actual channel number and timestamp if the meta-event code represents a "previous channel" event; and
transforming the meta-event code into raw event data as appropriate to the semantics of the particular meta-event code if the meta-event code is not a "channel surf" or "previous channel" event.

13. The method of claim 9, wherein the receiving device is one of a: centralized server, cable, satellite, or IP TV company headend server, or distributed server.

14. The method of claim 9, wherein the outputting further comprises transmitting transformed and untransformed codes over one of a: cable, satellite, or IP TV network, the Internet, local area network, or cellular network.

15. The method of claim 9, wherein meta-events are determined using statistical analysis of streams of raw user event data over populations of users to identify common event streams suitable for replacement by abbreviated meta-event codes.

16. A system for reducing the amount of user event data, the system comprising:
a computer processor configured to sequentially log raw user event codes generated by a user device, wherein the raw user event codes comprise codes indicating button activations and other raw inputs from input devices associated with the user device;
a computer processor configured to transform a portion of the sequentially-logged raw user event codes into meta-event codes, wherein meta-event codes are abbreviated codes representing common sequences of raw user events in a form suitable for reconstituting on a receiving device;
a computer processor configured to output transformed and untransformed codes to the receiving device; and
wherein the meta-event codes are reconstituted at the receiving device into the portion of the sequentially-logged raw user event codes by interpreting semantics of the meta-event codes in a context of the untransformed codes that were output to the receiving device.

17. The system of claim 16, wherein the raw user event codes comprise one of the following time-stamped items:
television channel change event codes, mute/un-mute event codes, volume change level codes, start, stop, pause, rewind, fast-forward audio/video recorder event codes, power on/off event codes, trick play event codes, keyboard key press event codes, mouse pointing device event codes, microphone input event codes, video input event codes, GPS location codes, keypad press codes, accelerometer event codes, and gesture detection device event codes.

18. The system of claim 16, wherein the user device is one of a: set-top box, integrated television controller, audio/video tuner or receiver, digital video recorder, personal video recorder, game console, personal computer, tablet computer, smart phone, personal digital assistant, or kiosk.

19. The system of claim 16, wherein the computer processor configured to transform a portion of the sequentially-logged raw user event codes into meta-event codes is further configured to:
    buffer multiple television channel-change/timestamp event codes while the codes represent a sequence of monotonically increasing or decreasing valid channel numbers each tuned for a short configurable amount of time; and
    replace those codes with an abbreviated code representing the "channel surf" meta-event with an associated timestamp.

20. The system of claim 16, wherein the computer processor configured to transform a portion of the sequentially-logged raw user event codes into meta-event codes is further configured to:
    buffer multiple television channel-change/timestamp event codes while the codes represent a sequence of alternating channel numbers; and
    replace the channel number part of the code with an abbreviated code representing the "previous channel" meta-event for those codes that indicate a return to an immediately previously-tuned channel.

21. The system of claim 16, wherein the receiving device is one of a: centralized server, cable, satellite, or IP TV company headend server, or distributed server.

22. The system of claim 16, wherein the computer processor configured to output transformed codes to the receiving device is further configured to transmit transformed and untransformed codes over one of a: cable, satellite, or IP TV network, the Internet, local area network, or cellular network.

23. The system of claim 16, wherein meta-events are determined using statistical analysis of streams of raw user event data over populations of users to identify common event streams suitable for replacement by abbreviated meta-event codes.

24. A system for reconstituting user event data, the system comprising:
    a computer processor configured to sequentially log raw user event codes generated by a user device;
    a computer processor configured to transform a portion of the sequentially-logged raw user event codes into meta-event codes when reducible sequences are detected;
    a computer processor configured to sequentially access the raw user event codes and the meta-event codes, wherein the raw user event codes comprise codes indicating button activations and other raw inputs from input devices associated with the user device, wherein the meta-event codes are abbreviated codes representing common sequences of raw user events;
    a computer processor configured to detect and reconstitute the meta-event codes into the portion of the sequentially-logged raw user event codes;
    a computer processor configured to output the reconstituted codes and untransformed raw user event codes in the proper sequence; and wherein the meta-event codes are reconstituted at the user device into the portion of the sequentially-logged raw user event codes by interpreting semantics of the meta-event codes in a context of the untransformed codes that were output to the user device.

25. The system of claim 24, wherein the raw user event codes comprise one of the following time-stamped items:
    television channel change event codes, mute/un-mute event codes, volume change level codes, start, stop, pause, rewind, fast-forward audio/video recorder event codes, power on/off event codes, trick play event codes, keyboard key press event codes, mouse pointing device event codes, microphone input event codes, video input event codes, GPS location codes, keypad press codes, accelerometer event codes, and gesture detection device event codes.

26. The system of claim 24, wherein the user device is one of a: set-top box, integrated television controller, audio/video tuner or receiver, digital video recorder, personal video recorder, game console, personal computer, tablet computer, smart phone, personal digital assistant, or kiosk.

27. The system of claim 24, wherein the computer processor configured to detect and reconstitute the meta-event codes into the portion of the sequentially-logged raw user event codes is further configured to:
    identify the type of meta-event code;
    transform the meta-event code into an appropriate sequence of channel tuning events if the meta-event code represents a "channel surf" event;
    transform the meta-event code into the appropriate actual channel number and timestamp if the meta-event code represents a "previous channel" event; and
    transform the meta-event code into raw event data as appropriate to the semantics of the particular meta-event code if the meta-event code is not a "channel surf" or "previous channel" event.

28. The system of claim 24, wherein the receiving device is one of a: centralized server, cable, satellite, or IP TV company headend server, or distributed server.

29. The system of claim 24, wherein the computer processor configured to output reconstituted codes to the receiving device is further configured to transmit transformed and untransformed codes over one of a: cable, satellite, or IP TV network, the Internet, local area network, or cellular network.

30. The system of claim 24, wherein meta-events are determined using statistical analysis of streams of raw user event data over populations of users to identify common event streams suitable for replacement by abbreviated meta-event codes.

* * * * *